United States Patent
Helman et al.

(10) Patent No.: US 8,381,022 B2
(45) Date of Patent: *Feb. 19, 2013

(54) DATA STORAGE WITH SNAPSHOT-TO-SNAPSHOT RECOVERY

(75) Inventors: Haim Helman, Tel Aviv (IL); Shemer Schwarz, Tel Aviv (IL); Omri Palmon, Tel Aviv (IL); Kariel E. Sandler, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,143

(22) Filed: Apr. 18, 2011

(65) Prior Publication Data

US 2011/0196841 A1   Aug. 11, 2011

Related U.S. Application Data

(63) Continuation of application No. 12/192,201, filed on Aug. 15, 2008, now Pat. No. 7,979,735.

(51) Int. Cl.
   *G06F 11/00* (2006.01)
(52) U.S. Cl. .................. 714/6.12; 714/6.3
(58) Field of Classification Search ............. 714/6, 6.12, 714/6.3
   See application file for complete search history.

(56) References Cited

U.S. PATENT DOCUMENTS

| | | | |
|---|---|---|---|
| 5,230,047 A | 7/1993 | Frey, Jr. et al. | |
| 6,226,759 B1 | 5/2001 | Miller et al. | |
| 6,530,035 B1 | 3/2003 | Bridge | |
| 6,631,477 B1 | 10/2003 | LeCrone et al. | |
| 6,745,304 B2 | 6/2004 | Playe | |
| 6,886,075 B2 | 4/2005 | Yagisawa et al. | |
| 6,934,822 B2 | 8/2005 | Armangau et al. | |
| 6,993,761 B1 | 1/2006 | Czajkowski et al. | |
| 7,069,402 B2 | 6/2006 | Coulter et al. | |
| 7,127,578 B2 | 10/2006 | Nagata | |
| 7,165,156 B1 | 1/2007 | Cameron et al. | |
| 7,191,304 B1 | 3/2007 | Cameron et al. | |
| 7,313,720 B1 | 12/2007 | Eng et al. | |
| 7,334,095 B1 | 2/2008 | Fair et al. | |
| 7,398,418 B2 | 7/2008 | Soran et al. | |
| 7,457,982 B2 | 11/2008 | Rajan | |
| 7,509,535 B1 | 3/2009 | Gulve et al. | |
| 7,539,694 B1 | 5/2009 | Althoff et al. | |
| 7,552,358 B1 | 6/2009 | Asgar-Deen et al. | |
| 7,661,028 B2 | 2/2010 | Erofeev | |
| 7,783,848 B2 | 8/2010 | Yamagami | |
| 7,865,582 B2 * | 1/2011 | Santos et al. .................. 709/223 |
| 2003/0131278 A1 | 7/2003 | Fujibayashi | |
| 2003/0187887 A1 | 10/2003 | Beal | |
| 2004/0030951 A1 | 2/2004 | Armangau | |
| 2006/0174075 A1 | 8/2006 | Sutoh | |
| 2006/0253670 A1 | 11/2006 | Zohar et al. | |
| 2006/0253681 A1 | 11/2006 | Zohar et al. | |

(Continued)

FOREIGN PATENT DOCUMENTS

EP   1804165 A2   7/2007

*Primary Examiner* — Joshua P Lottich
(74) *Attorney, Agent, or Firm* — Griffiths & Seaton PLLC

(57) ABSTRACT

Embodiments of the present invention provide methods, apparatuses, systems, and computer software products for data storage. A first copy of a logical volume is created. A second copy of the logical volume is created based on the first copy of the logical volume, such that the first and second copies are represented by respective first and second sets of pointers to physical storage locations in which data used by the copies is stored. Responsively to a corruption of at least part of the data that is used by the first copy. The first copy is restored from the second copy by replacing the first set with the pointers in the second set.

15 Claims, 4 Drawing Sheets

U.S. PATENT DOCUMENTS

| | | |
|---|---|---|
| 2006/0271645 A1 | 11/2006 | Theimer et al. |
| 2007/0094277 A1 | 4/2007 | Fachan et al. |
| 2007/0094310 A1 | 4/2007 | Passey et al. |
| 2007/0168707 A1 | 7/2007 | Kern et al. |
| 2007/0174669 A1 | 7/2007 | Ebata et al. |
| 2007/0226535 A1 | 9/2007 | Gokhale |
| 2007/0234109 A1 | 10/2007 | Soran et al. |
| 2007/0234110 A1 | 10/2007 | Soran et al. |
| 2009/0300412 A1 | 12/2009 | Soran et al. |
| 2010/0050013 A1 | 2/2010 | Soran et al. |

* cited by examiner

DATA STORAGE WITH SNAPSHOT-TO-SNAPSHOT RECOVERY

CROSS-REFERENCE TO RELATED APPLICATION

This application is a continuation of U.S. patent application Ser. No. 12/192,201, filed Aug. 15, 2008, which is incorporated herein by reference.

BACKGROUND OF THE INVENTION

The present invention relates generally to data storage, and particularly to methods and systems for restoring data in data storage systems.

Data storage systems typically store data on physical media in a manner that is transparent to host computers. From the perspective of a host computer, data is stored at logical addresses located in file systems, or logical volumes. Logical volumes are typically configured to store the data required for a specific data processing application. Data storage systems map such logical addresses to addressable physical locations on storage media, such as direct access hard disks.

System administrators frequently make copies of logical volumes, for example in order to perform backups or to test and validate new applications. Such copies are commonly referred to as snapshots.

SUMMARY OF THE INVENTION

An embodiment of the present invention provides a method for data storage. The method includes creating a first copy of a logical volume. A second copy of the logical volume is created based on the first copy of the logical volume, such that the first and second copies are represented by respective first and second sets of pointers to physical storage locations in which data used by the copies is stored. Responsively to a corruption of at least part of the data that is used by the first copy. The first copy is restored from the second copy by replacing the first set with the pointers in the second set. Apparatuses, systems and computer software products for data storage are also provided.

In some embodiments, restoring the first copy from the second copy includes updating a list indicating respective numbers of the copies whose pointers point to the physical storage locations.

In a disclosed embodiment, creating the copies includes representing the copies by a hierarchical tree structure including nodes, such that each of the nodes includes a respective set of local pointers and the copies are represented by respective nodes such that the local pointers in the nodes located along a path via the tree structure that connects a given node to a root node of the tree structure point to the physical storage locations in which the data used by the given copy is stored.

In an embodiment, the tree structure includes first and second nodes respectively representing the first and second copies, the second node is connected to the root node via a first path via the tree structure, and restoring the first copy from the second copy includes deleting the first node from the tree structure and creating a new node representing the restored first copy, such that the new node is connected to the root node via a second path whose nodes have the same local pointers as the nodes along the first path.

In another embodiment, creating the new node includes creating an artificial node to replace the second node in the tree structure, and positioning the second node and the new node below the artificial node. In yet another embodiment, creating the artificial node includes assigning the local pointers of the second node to the artificial node, and positioning the second node and the new node includes configuring the second node and the new node to have no local pointers. In some embodiments, creating the copies and restoring the first copy from the second copy include communicating with a host computer over a Storage Area Network (SAN).

The present invention will be more fully understood from the following detailed description of the embodiments thereof, taken together with the drawings in which:

DETAILED DESCRIPTION OF PREFERRED EMBODIMENTS

Overview

One of the prime reasons for creating snapshots is to back-up data against data corruption. Various known data storage systems are able to restore a corrupted logical volume from a previously-created snapshot of the volume. In some cases, however, it is desirable to restore a snapshot whose data is corrupted using another snapshot of the logical volume. For example, in some storage systems snapshots are accessed by host applications similarly to logical volumes. In such systems, a corrupted snapshot may need to be restored from another snapshot in order to resume operation of the application.

Embodiments of the present invention that are described hereinbelow provide methods and systems for restoring snapshots of logical volumes from other snapshots. In some embodiments, a storage controller stores data on behalf of a host computer in a storage device. The data sent from the host computer is addressed to a logical volume, which has been assigned to the host on the storage device. In response to host commands, the storage controller creates multiple copies (snapshots) of the logical volume.

Each copy is represented by a set of pointers that point to physical storage locations on the storage device where the data used by the copy is stored. Such copies are referred to as thinly-provisioned copies, since the data itself is not duplicated on the storage device unless it is modified.

In some embodiments, the storage controller restores a corrupted copy from another copy of the logical volume by replacing the set of pointers of the corrupted copy with the set of pointers of the other copy. In the context of the present patent application and in the claims, the term "corruption" refers to any event that causes at least part of the data in a given copy to become unusable or unavailable. Corruption may occur, for example, as a result of accidental deletion of data, because of virus infection and/or for any other reason.

In some embodiments, the storage controller maintains a list that records the number of logical volumes and copies that point to each physical storage location. In these embodiments, the storage controller updates the list after restoring the copy.

In some embodiments, the storage controller represents a set of copies of a given logical volume using a hierarchical tree structure. An efficient process of restoring a corrupted copy from another copy using the hierarchical tree structure is described herein.

System Description

Figure 1:
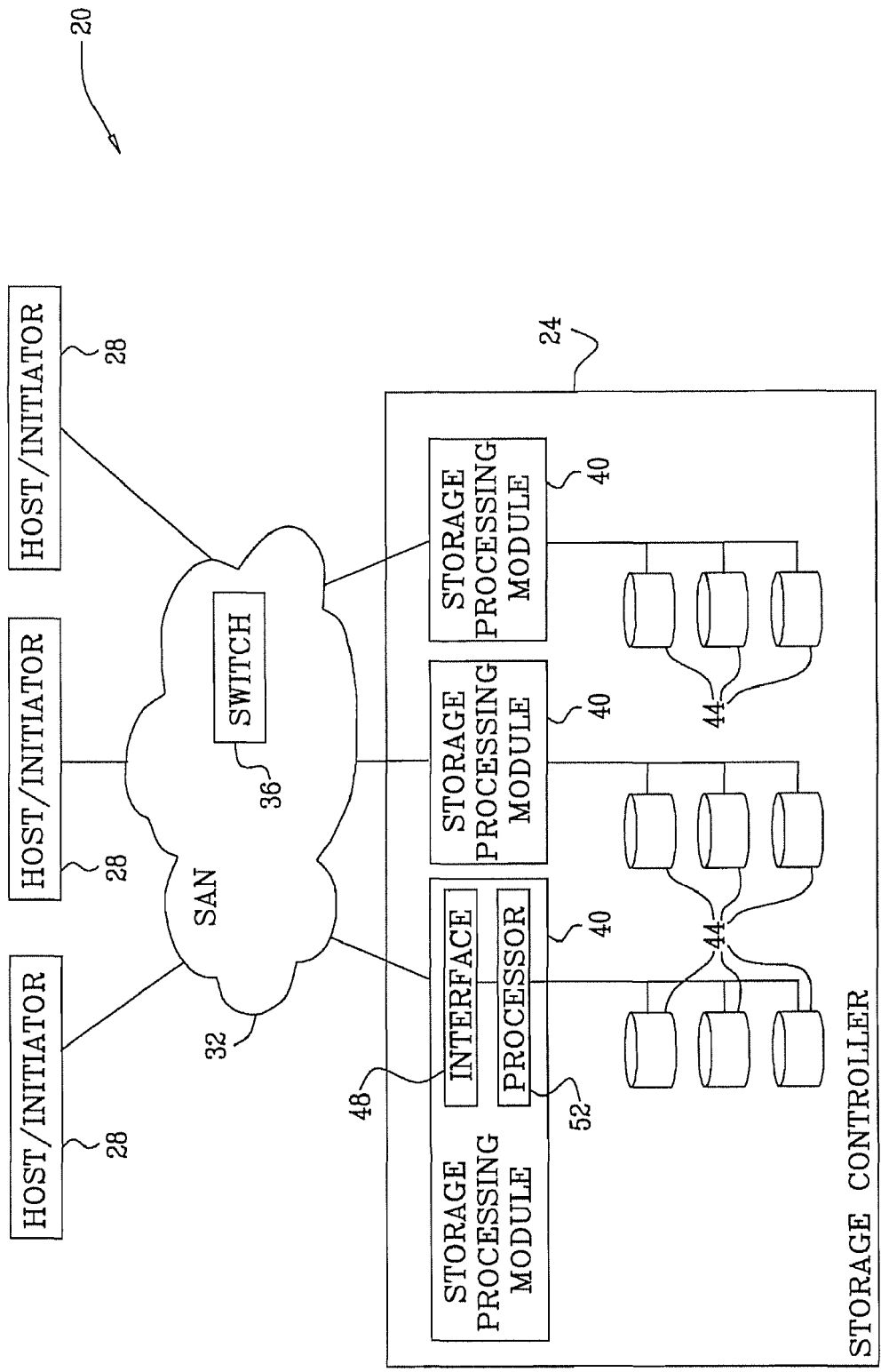
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises a storage controller 24, which stores and retrieves data for hosts 28. The hosts are also referred to as initiators.

In the configuration of FIG. 1, the hosts are connected to the storage controller via a Storage Area Network (SAN) 32, as is known in the art. The SAN typically comprises one or more network switches 36. The hosts and storage controller may communicate over SAN 32 using any suitable protocol, such as the Small Computer System Interface (SCSI) and/or Fibre-Channel (FC) protocols. Although the embodiment of FIG. 1 refers to a SAN configuration, the hosts and storage controller may be connected using any other suitable configuration, such as a Network-Attached Storage (NAS) or Direct-Attached Storage (DAS) configuration.

Storage controller 24 comprises multiple storage processing modules 40, which store data in multiple storage devices, such as disks 44. Storage controller 24 may comprise any desired number of modules 40 and any desired number of disks 44. In a typical configuration, the storage controller may comprise between 1-32 storage processing modules and between 2-2000 disks, although any other suitable numbers can also be used. In the exemplary configuration of FIG. 1, each module 40 stores data in a separate set of disks 44. In alternative embodiments, however, a given disk 44 need not be uniquely associated with a particular module 40. For example, a pool of disks 44 may be common to all modules 40.

Each storage processing module 40 comprises a network interface 48 for communicating with hosts 28 over SAN 32, and a processor 52, which carries out the various storage and retrieval tasks of the module. In particular, processor 52 restores corrupted snapshots of logical volumes from other snapshots, using methods that are described in detail below.

Logical Volumes and Snapshots

Storage controller 24 stores data on disks 44 by allocating logical volumes to hosts 28, or to specific applications running on the hosts. Each logical volume is typically identified by a unique Logical Unit Number (LUN). From the perspective of the host, an application issues Input/Output commands (e.g., read and write commands) to a logical volume, without knowledge of the physical storage locations in disks 44 in which the data is actually stored.

In various scenarios, a user (e.g., a system administrator) creates copies of logical volumes. Copies of logical volumes are often referred to as snapshots, and the two terms are used interchangeably herein. Copies may be used, for example, for backing-up the logical volume. As another example, it is sometimes advantageous to perform certain low-priority processing tasks, such as collection of statistics, on a copy of a logical volume rather than on the logical volume itself. This mode of operation is especially important when the logical volume is accessed frequently and/or by multiple initiators. Performing some tasks on a copy reduces the likelihood of concurrent access requests to the logical volume.

Once created, a snapshot may be modified similarly to a logical volume. In other words, the hosts may write data to a snapshot in a similar manner to writing data to a logical volume. In some implementations, each snapshot is assigned a corresponding LUN and the hosts are aware of these LUNs. Typically, processor 52 holds a mapping table that maps LUNs of logical volumes and snapshots to physical addresses on disks 44.

In some embodiments, processor 52 also maintains a table that maps external LUN names of logical volumes and snapshots (as seen by the hosts, externally to the storage controller) to internal volume and snapshot names used internally to the storage controller. The use of this table in restoring snapshots is explained further below.

In some embodiments, processor 52 represents each snapshot by a list of pointers to the physical partitions (or other form of physical storage locations) on disks 44 that belong to the snapshot. Such a representation is referred to as a "thinly-provisioned" representation. When using thinly-provisioned snapshots, creation of a new snapshot does not involve physical writing of data on disks 44. Data is written physically only when it is modified. In some embodiments, processor 52 further maintains a use-count list, which indicates the number of logical volumes and snapshots that use each physical partition. (A physical partition is sometimes referred to as a page. The terms "physical storage location," "physical page," "physical partition," "storage location," "page" and "partition" are used interchangeably herein.)

For example, consider a logical volume denoted V1, for which an administrator has created two snapshots denoted S1 and S2. At a certain point in time, volume V1 uses partitions $\{0, 1, 2, 3, 4, 5\}$, snapshot S1 uses partitions $\{0, 1, 2, 3, 104, 5\}$ and snapshot S2 uses partitions $\{0, 1, 2, 3, 104, 105\}$. The following use-count list corresponds to this scenario:

| Physical partition | Number of logical volumes and snapshots using the partition |
|---|---|
| 0 | 3 |
| 1 | 3 |
| 2 | 3 |
| 3 | 3 |
| 4 | 1 |
| 5 | 2 |
| 104 | 2 |
| 105 | 1 |

In a typical scenario, a given logical volume may have multiple snapshots. Some snapshots may be created from previous snapshots, i.e., snapshots of snapshots. The physical partitions used by different snapshots of a given logical volume may have various degrees of commonality.

In some embodiments, processor 52 represents a set of thinly-provisioned snapshots of a given logical volume using a hierarchical data structure, i.e., a tree structure. The nodes of the tree represent snapshots. Each node has a set of pointers to a (possibly empty) set of physical partitions. The pointers specified in a given node are referred to as the local pointers or local physical partitions of the node.

The snapshots populate the tree so that each snapshot uses its local partitions and the partitions that are pointed to by the nodes that connect it to the root. This tree representation is efficient, since it exploits the inherent commonality in physical partitions among different snapshots. Physical partitions that are used by multiple snapshots can be located at high levels of the tree, instead of duplicating them in multiple individual snapshots.

In some embodiments, the tree comprises a binary tree, i.e., each node is either a leaf having no lower-level nodes or has exactly two lower-level nodes. In these embodiments, the snapshots populate only the leaves of the tree. Higher-level nodes comprise virtual nodes that are referred to as meta-volumes (MV) or artificial nodes. The meta-volumes are not associated with snapshots. Each node, including the leaves (representing the snapshots) and the meta-volumes, has a corresponding (possibly empty) set of local pointers to physical partitions on disks 44.

The use of the tree structure for performing various operations on snapshots is demonstrated in FIGS. 2 and 4 below. Further aspects of using hierarchical data structures for representing snapshots are addressed, for example, in U.S. Patent Application Publications 2006/0253670 and 2006/0253681.

Figure 2:
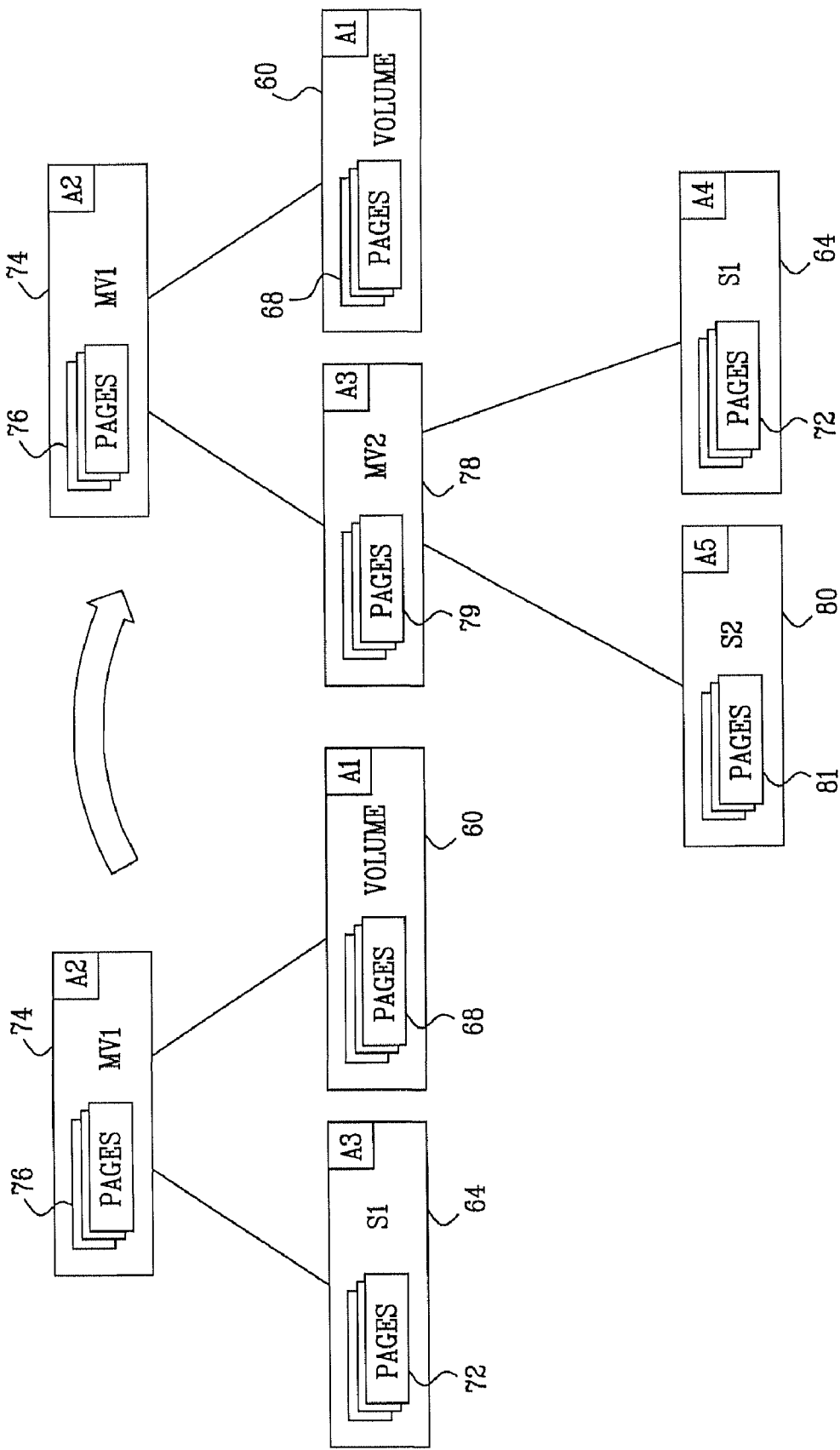
FIG. 2 is a diagram that schematically illustrates a hierarchical data structure representing snapshots of a logical volume, in accordance with an embodiment of the present invention.

FIG. 2 is a diagram that schematically illustrates a hierarchical data structure representing snapshots of a logical volume, in accordance with an embodiment of the present invention. Referring to the left-hand-side of the figure, a logical volume 60 has a snapshot 64 denoted S1. Volume 60 uses a set of local pages 68, and snapshot 64 uses a set of local pages 72. (More accurately, the tree node representing the volume specifies a set of local pointers 68 that point to physical pages used by the volume. Similarly, the tree node representing snapshot 51 specifies a set of local pointers 72. In the description that follows, the phrase "a node has a set of local pages" means that the node has a set of local pointers that point to physical pages on disks 44.)

In the present example, the tree comprises a binary tree in which volumes and snapshots populate only the leaves. Thus, when creating snapshot S1, processor 52 creates a meta-volume 74 (denoted MV1) as the root of the tree. Processor 52 positions node 60 (the volume) and node 64 (snapshot S1) below the meta-volume. Node 74 has a corresponding set of pointers 76 to physical pages.

The right-hand-side of the figure shows the hierarchical tree structure after creation of an additional snapshot. The newly-added snapshot is created from snapshot S1 and is denoted S2. When creating the newly-added snapshot from snapshot S1, processor 52 creates a second meta-volume 79 (denoted MV2) under the root. Processor 52 positions node 64 (snapshot S1) below the newly-created meta-volume, and creates a new leaf node 80, which represents snapshot S2. Node 80 has a corresponding set of pointers 81 to physical pages.

As noted above, each snapshot uses the pages of its respective nodes and of the nodes that connect it to the root. In the present example, new snapshot 80 uses pages 72D, 72C and 64. Pages can be moved from one node to another depending on the commonalities among different snapshots.

FIG. 2 also demonstrates the mapping of external LUN names to internal names of volumes and snapshots. On the left hand side of the figure (before adding snapshot S2 to the tree), the mapping is given by the following table:

| Internal name | External LUN name |
|---|---|
| A1 | Volume |
| A2 | MV1 |
| A3 | S1 |

On the left hand side of the figure (before adding snapshot S2 to the tree), the mapping is given by the following table:

| Internal name | External LUN name |
|---|---|
| A1 | Volume |
| A2 | MV1 |
| A3 | MV2 |
| A4 | S1 |
| A5 | S2 |

The internal names are used by processor 52 to refer to specific nodes in the tree structure. The external LUN names are the names that are visible to the hosts, and which are used by the hosts when accessing a desired logical volume or snapshot. In some embodiments, meta volumes are not exposed to the hosts.

Adding a snapshot or otherwise modifying the tree structure may change the mapping between internal and external names. The internal names remain attached to the same locations in the tree, whereas the external names of these nodes may change to represent different volumes or snapshots. In the example of FIG. 2, when snapshot S2 is added, the tree node represented by the internal name A3, which was previously mapped to snapshot S1, is now mapped to meta-volume MV2. Snapshots S1 and S2 are now represented by new nodes in the tree, respectively denoted A4 and A5. Typically, processor 52 updates the table to reflect the new mapping.

Restoring a Snapshot from Another Snapshot

As explained above, snapshots are typically created to protect against data corruption. Various known data storage applications restore a corrupted logical volume from a previously-created snapshot of the volume. In some cases, however, it is desirable to restore a snapshot that has been corrupted from another snapshot of the logical volume. Restoring a snapshot from another snapshot is often a highly-complex task, especially when using thinly-provisioned snapshots.

Embodiments of the present invention provide methods and systems for restoring a snapshot of a given logical volume from another snapshot of the volume. In the description that follows, the snapshot from which the data is restored is referred to as a source snapshot. The corrupted snapshot that is to be restored is referred to as a destination snapshot. The source snapshot may be older or more recent than the destination snapshot.

Figure 3:
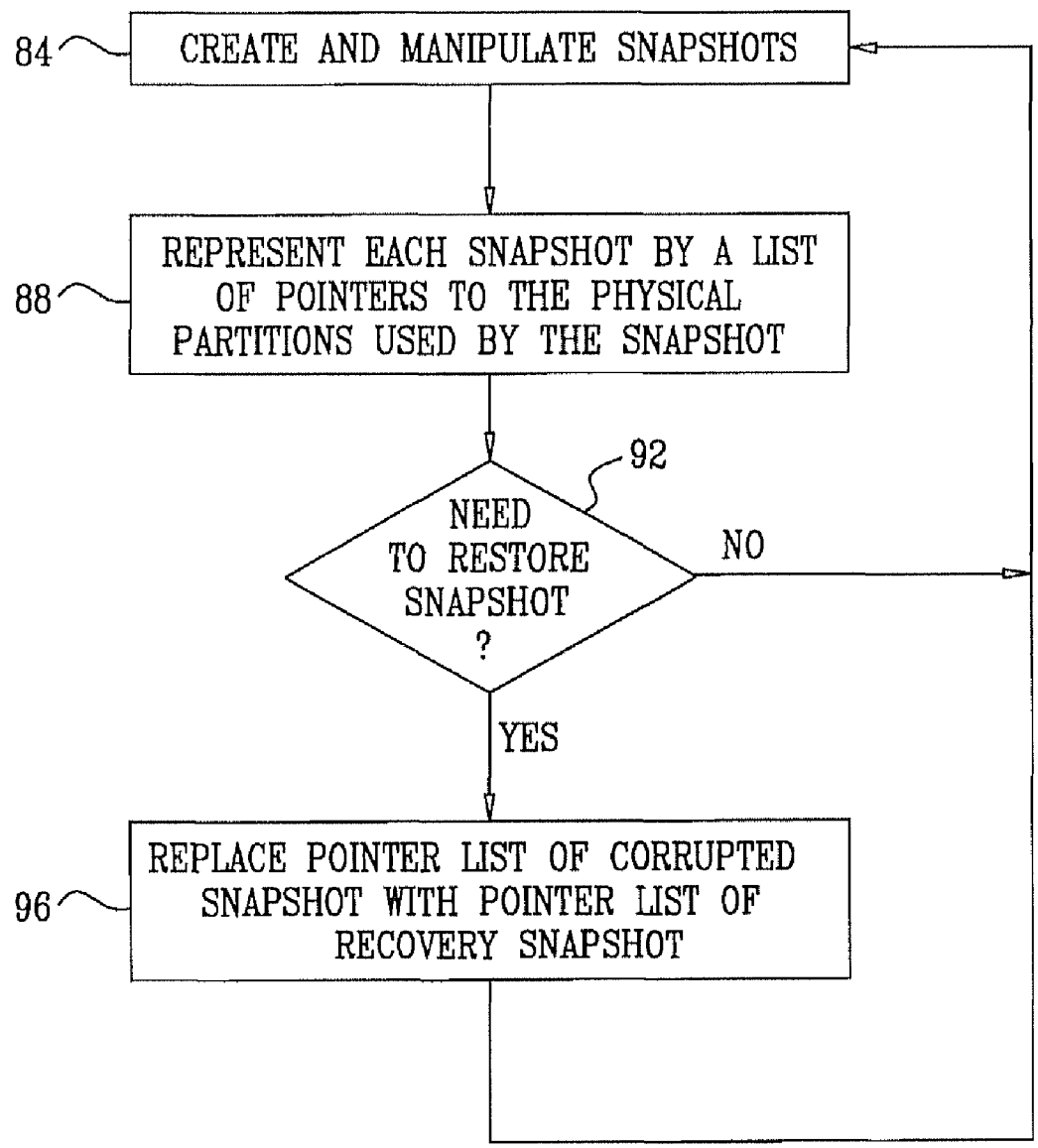
FIG. 3 is a flow chart that schematically illustrates a method for restoring a snapshot from another snapshot, in accordance with an embodiment of the present invention.

FIG. 3 is a flow chart that schematically illustrates a method for restoring a snapshot from another snapshot, in accordance with an embodiment of the present invention. The method begins with processor 52 creating and manipulating snapshots of a given logical volume, at a snapshot manipulation step 84. Processor 52 represents each snapshot by a list of pointers to the physical partitions on disks 44 that are used by the snapshot and have been physically written to disks 44, at a representation step 88. Typically although not necessarily, processor 52 represents the set of snapshots using a hierarchical tree structure, as described above.

Processor 52 checks whether a snapshot is to be restored from another snapshot, at a checking step 92. Various conditions and events can provide a trigger to restore a snapshot. For a thinly-provisioned snapshot, the snapshot is to be restored when data corruption occurs in at least part of the data used by the snapshot.

In some embodiments, processor 52 may receive a request from one of hosts 28 to restore a given snapshot. The hosts are typically aware of the identities (e.g., LUNs) of the different snapshots, and may request the storage controller to restore one snapshot from another snapshot for any reason. If no snapshot is to be restored, the method loops back to step 84 above.

Otherwise, processor 52 restores the requested destination snapshot from a certain source snapshot, at a restoration step 96. In some embodiments, processor 52 restores the destination snapshot by replacing the pointer list of the destination snapshot with the list of the source snapshot. The method then loops back to step 84 above. When processor 52 maintains a use-count list of the different physical partitions, the processor updates the list after restoring the snapshot.

For example, consider the example given above, in which a logical volume V1 uses partitions {0, 1, 2, 3, 4, 5}, a snapshot S1 of the volume uses partitions {0, 1, 2, 3, 104, 5} and another snapshot S2 uses partitions {0, 1, 2, 3, 104, 105}. In the present example, assume that snapshot S1 is corrupted and that processor 52 is requested to restore snapshot S1 from the data of snapshot S2. In order to perform this recovery, processor 52 replaces the pointer list of snapshot S1 with the list of snapshot S2. After restoration, logical volume V1 uses partitions {0, 1, 2, 3, 4, 5}, and both snapshots S1 and S2 use partitions {0, 1, 2, 3, 104, 105}. The following table shows the updated use-count list after S1 has been restored:

| Physical partition | Number of logical volumes and snapshots using the partition |
|---|---|
| 0 | 3 |
| 1 | 3 |
| 2 | 3 |
| 3 | 3 |
| 4 | 1 |
| 5 | 1 |
| 104 | 2 |
| 105 | 2 |

When using a binary tree structure as explained above, processor 52 may restore a certain destination snapshot from a certain source snapshot by modifying the tree using the following sequence of steps (a process that is demonstrated graphically in FIG. 4 below):

Create a new volume.

Convert the source snapshot into a meta-volume, and update the mapping between internal and external names accordingly.

Create two tree nodes under the meta-volume. One of the new nodes represents the source snapshot and the other represents the restored destination snapshot.

Delete the tree node that represented the corrupted version of the destination snapshot.

Figure 4:
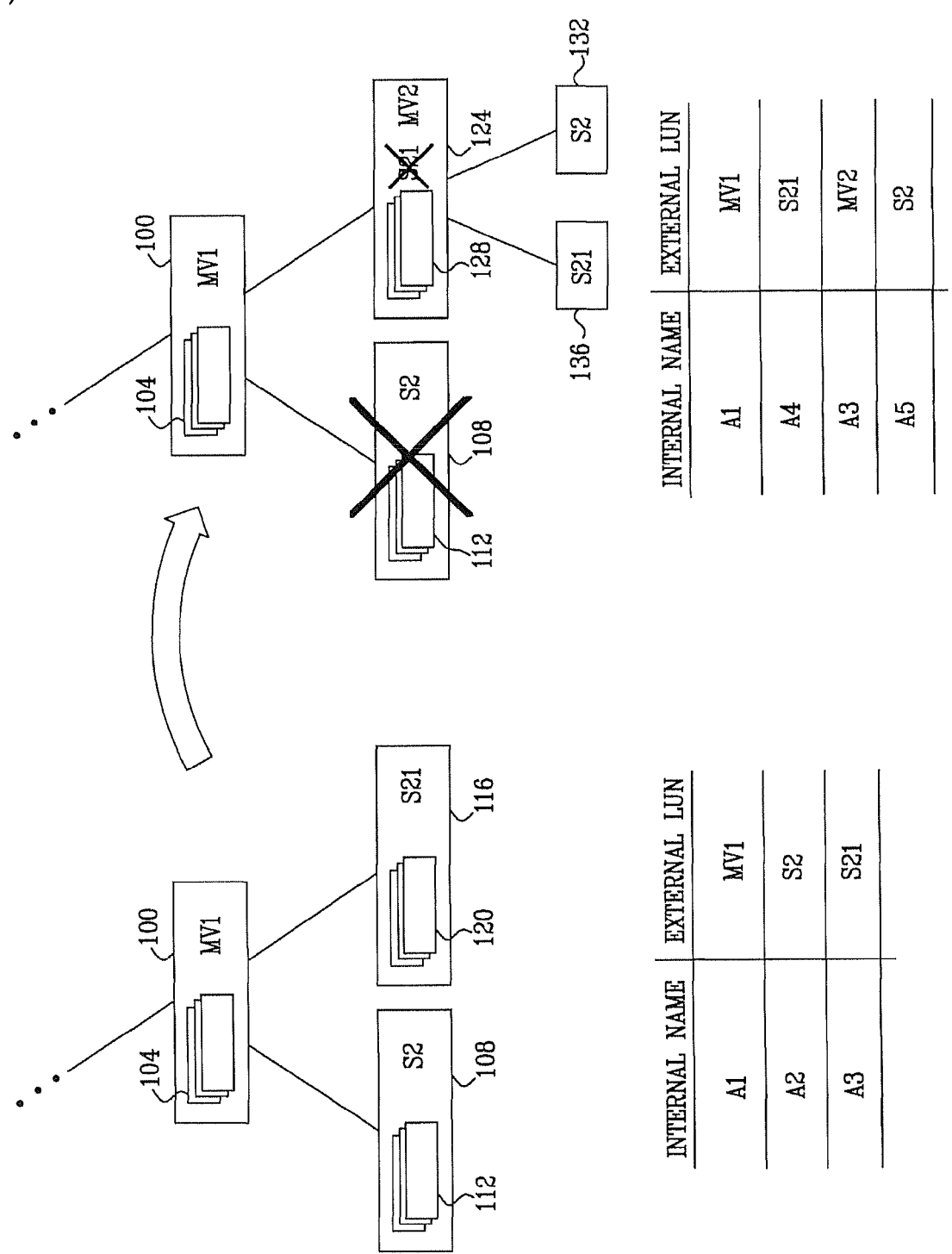
FIG. 4 is a diagram that schematically illustrates a process of restoring a snapshot from another snapshot using a hierarchical data structure representing the snapshots, in accordance with an embodiment of the present invention.

FIG. 4 is a diagram that schematically illustrates the process of restoring a snapshot from another snapshot using a hierarchical data structure representing the snapshots, in accordance with an embodiment of the present invention.

In principle, processor 52 restores a given destination snapshot that has been corrupted from a certain source snapshots by:

Deleting the node representing the corrupted snapshot from the tree structure; and Creating a new node for the restored destination snapshot, such that the path connecting the new node to the root and the path connecting the source node (the node representing the source snapshot) to the root have the same set of local pages (pointers).

In the example of FIG. 4, the left-hand-side of the figure shows part of a tree structure representing the set of snapshots of a given logical volume. This part of the tree comprises a meta-volume node 100 (denoted MV1) having pages 104. Node 100 has two lower-level nodes 108 and 116, which represent snapshots S2 and S21, respectively. In the present example, S21 is a snapshot created from S2, but the process described herein is in no way limited to such a relationship. Snapshot node 108 has pages 112, and snapshot node 116 has pages 120.

As explained above, snapshot S2 uses pages 112, pages 104, as well as the pages in the nodes that connect meta-volume node 100 to the root. Similarly, snapshot S21 uses pages 120, pages 104, and the pages in the nodes that connect the meta-volume node to the root.

In the present example, S2 is corrupted, and processor 52 is requested to restore the data of S2 from snapshot S21. The processor restores S2 from S21 by performing the following sequence of steps in the tree structure, as illustrated on the right-hand-side of FIG. 4:

Delete node 108 (the previous S2) and its local pointers 112.

Reconfigure the previous S21 to become a meta-volume node 124. Retain pointers 120 of the previous S21 as pointers 128 of the newly-configured meta-volume node.

Create a new snapshot node 132 under meta-volume node 124 for representing the restored S2 snapshot. Initialize the pointer list of node 132 to an empty list.

Create a new snapshot node 136 under meta-volume node 124 for representing S21. Initialize the pointer list of node 136 to an empty list.

After performing this sequence of steps, the updated tree structure represents the restored snapshot S2 and the existing snapshot S21, each with its corresponding set of local pages. Regarding S21: Node 136 initially has no local pointers, and snapshot S21 initially uses pages 128, 104 and any additional pages leading up to the root. Since pages 128 are identical to pages 120, the set of pages used by S21 after restoration is identical to the set of pages used before the restoration. Regarding S2: Node 132 initially has no local pointers, and thus snapshot S2 initially uses pages 128, 104 and any additional pages leading up to the root. Thus, S2 initially uses the same set of pages as S21.

Immediately following the restoration, nodes 132 and 136 have no local pointers. Local pointers may be added to these nodes as the data in the different snapshots is modified.

The bottom of FIG. 4 shows the mapping between the internal names of volumes/snapshots and the external LUN names recognized by the hosts. On the left hand side of the figure (before restoration), the external LUNs of MV1, S2 and S21 are mapped to the internal names A1, A2 and A3, respectively. (MV1 is typically not exposed to the hosts.) On the left hand side (after restoring S2 from S21), the external LUNs of MV1, S21, MV2 and S2 are mapped to the internal names A1, A4, A3 and A5, respectively.

In other words, the tree node that prior to restoration represented S21 and after restoration represents MV2, retained its internal name A3. The tree node that before restoration represented S2 was deleted from the tree. As such, the internal name A2, which previously represented S2, is not used after restoration. The two new nodes that after restoration represent S21 and S2 are assigned new internal names A4 and A5, respectively. Typically, processor 52 updates the mapping table to reflect the mapping after restoration.

The example of FIG. 4 addresses a case in which the source snapshot is a direct descendent of the destination snapshot. This choice, however, was made purely for the sake of conceptual clarity. The methods described herein can be used for restoring any destination snapshot from any source snapshot, regardless of the hierarchical relationship between them.

As will be appreciated by one skilled in the art, the present invention may be embodied as a system, method or computer program product. Accordingly, the present invention may take the form of an entirely hardware embodiment, an entirely hardware embodiment or an embodiment combining software (including firmware, resident software, micro-code, etc.) and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A method for data storage comprising:
   creating a first copy of a logical volume;
   creating a second copy of the logical volume based on the first copy of the logical volume, such that the first and second copies are represented by respective first and second sets of pointers to physical storage locations in which data used by the copies is stored; and
   responsively to a corruption of at least part of the data that is used by the first copy, restoring the first copy, from the second copy by replacing the first set with the pointers in the second set,
   wherein creating the copies comprises representing, the copies by a hierarchical tree structure comprising nodes, wherein each of the nodes comprises a respective set of local pointers, and wherein the copies are represented by respective nodes such that the local pointers in the nodes located along a path via the tree structure that connects a given node to a root node of the tree structure point to the physical storage locations in which the data used by the given copy is stored, and wherein the tree structure comprises first and second nodes respectively representing the first and second copies, wherein the second node is connected to the root node via a first path via the tree structure, and wherein restoring the first copy from the second copy comprises deleting the first node from the tree structure and creating a new node representing the restored first copy, such that the new node is connected to the root node via a second path whose nodes have the same local pointers as the nodes along the first path.

2. The method according to claim 1, wherein restoring the first copy from the second copy comprises updating a list indicating respective numbers of the copies whose pointers point to the physical storage locations.

3. The method according to claim 1, wherein creating the new node comprises creating an artificial node to replace the second node in the tree structure, and positioning the second node and the new node below the artificial node.

4. The method according to claim 3, wherein creating the artificial node comprises assigning the local pointers of the second node to the artificial node, and wherein positioning the second node and the new node comprises configuring the second node and the new node to have no local pointers.

5. The method according to claim 1, wherein creating the copies and restoring the first copy from the second copy comprise communicating with a host computer over a Storage Area Network (SAN).

6. An apparatus for data storage, comprising:
an interface configured to communicate with a host computer to receive data for storage that is addressed to a logical volume assigned on a storage device; and
a processor coupled to the interface and adapted to:
create a first copy of a logical volume;
create a second copy of the logical volume based on the first copy of the logical volume, such that the first and second copies are represented by respective first and second sets of pointers to physical storage locations in which data used by the copies is stored; and
responsively to a corruption of at least part of the data that is used by the first copy, restore the first copy from the second copy by replacing the first set with the pointers in the second set,
wherein the processor is further adapted to represent the copies by a hierarchical tree structure comprising nodes, wherein each of the nodes comprises a respective set of local pointers, and wherein the copies are represented by respective nodes such that the local pointers in the nodes located along a path via the tree structure that connects a given node to a root node of the tree structure point to the physical storage locations in which the data used by the given copy is stored, and wherein the tree structure comprises first and second nodes respectively representing the first and second copies, wherein the second node is connected to the root node via a first path via the tree structure, and wherein the processor is coupled to restore the first copy from the second copy by deleting the first node from the tree structure and creating a new node representing the restored first copy, such that the new node is connected to the root node via a second path whose nodes have the same local pointers as the nodes along the first path.

7. The apparatus according to claim 6, wherein the processor is further adapted to update a list indicating respective numbers of the copies whose pointers point to the physical storage locations.

8. The apparatus according to claim 6, wherein the processor is further adapted to create the new node by creating an artificial node to replace the second node in the tree structure, and positioning the second node and the new node below the artificial node.

9. The apparatus according to claim 8, wherein the processor is further adapted to assign the local pointers of the second node to the artificial node and to configure the second node and the new node to have no local pointers.

10. The apparatus according to claim 6, wherein the interface is operative to communicate with the host computer over a Storage Area Network (SAN).

11. A data storage system, comprising:
a storage device;
an interface coupled to the storage device and configured to communicate with a host computer to receive data for storage that is addressed to a logical volume assigned on the storage device; and
a processor coupled to the interface and adapted to:
create a first copy of a logical volume;
create a second copy of the logical volume based on the first copy of the logical volume, such that the first and second copies are represented by respective first and second sets of pointers to physical storage locations in which data used by the copies is stored; and
responsively to a corruption of at least part of the data that is used by the first copy, restore the first copy from the second copy by replacing the first set with the pointers in the second set,
wherein the processor is further adapted to represent the copies by a hierarchical tree structure comprising nodes, wherein each of the nodes comprises a respective set of local pointers, and wherein the copies are represented by respective nodes such that the local pointers in the nodes located along a path via the tree structure that connects a given node to a root node of the tree structure point to the physical storage locations in which the data used by the given copy is stored, and wherein the tree structure comprises first and second nodes respectively representing the first and second copies, wherein the second node is connected to the root node via a first path via the tree structure, and wherein the processor is coupled to restore the first copy from the second copy by deleting the first node from the tree structure and creating a new node representing the restored first copy, such that the new node is connected to the root node via a second path whose nodes have the same local pointers as the nodes along the first path.

12. The system according to claim 11, wherein the processor is further adapted to update a list indicating respective numbers of the copies whose pointers point to the physical storage locations.

13. The system according to claim 11, wherein the interface is operative to communicate with the host computer over a Storage Area Network (SAN).

14. A computer software product for data storage, the product comprising a non-transitory computer-readable medium, in which program instructions are stored, the program instructions comprising:
a first executable portion for communicating with a host so as to receive data for storage that is addressed to a logical volume assigned on a storage device;
a second executable portion for creating a first copy of a logical volume;
a third executable portion for creating a second copy of the logical volume based on the first copy of the logical volume, such that the first and second copies are represented by respective first and second sets of pointers to physical storage locations in which data used by the copies is stored;
a fourth executable portion for responsively to a corruption of at least part of the data that is used by the first copy, restoring the first copy from the second copy by replacing the first set with the pointers in the second set; and a fifth executable portion for representing the copies by a hierarchical tree structure comprising nodes, wherein each of the nodes comprises a respective set of local pointers, and wherein the copies are represented by respective nodes such that the local pointers in the nodes located along a path via the tree structure that connects a given node to a root node of the tree structure point to the physical storage locations in which the data used by the given copy is stored, wherein the tree structure comprises first anal second nodes respectively representing the first and second copies, wherein the second node is connected to the root node via a first path via the tree structure, and wherein the instructions cause the computer to restore the first copy from the second copy by deleting the first node from the tree structure and creating a new node representing the restored first copy, such that the new node is connected to the root node via a second path whose nodes have the same local pointers as the nodes along the first path.

15. The product according to claim 14, wherein the instructions further comprise a sixth executable portion for updating a list indicating respective numbers of the copies whose pointers point to the physical storage locations.

* * * * *